(12) United States Patent
Brody et al.

(10) Patent No.: US 11,218,435 B1
(45) Date of Patent: Jan. 4, 2022

(54) SYSTEM AND METHOD OF MANAGING ELECTRONIC MEDIA CONTENT ITEMS

(71) Applicant: Snap Inc., Santa Monica, CA (US)

(72) Inventors: Jonathan Brody, Marina Del Rey, CA (US); Michael Brian Murray, Marina Del Rey, CA (US); Jeremy Voss, Los Angeles, CA (US)

(73) Assignee: Snap Inc., Santa Monica, CA (US)

( * ) Notice: Subject to any disclaimer, the term of this patent is extended or adjusted under 35 U.S.C. 154(b) by 52 days.

(21) Appl. No.: 16/051,020

(22) Filed: Jul. 31, 2018

(51) Int. Cl.
*H04L 12/58* (2006.01)
*H04L 29/08* (2006.01)

(52) U.S. Cl.
CPC .............. *H04L 51/10* (2013.01); *H04L 51/22* (2013.01); *H04L 67/2857* (2013.01)

(58) Field of Classification Search
CPC ...... H04L 51/10; H04L 51/22; H04L 67/2857
See application file for complete search history.

(56) References Cited

U.S. PATENT DOCUMENTS

| | | | | |
|---|---|---|---|---|
| 8,984,387 | B2* | 3/2015 | Koren | H04L 67/02 715/200 |
| 9,639,969 | B1* | 5/2017 | Wilson | H04L 51/32 |
| 9,824,477 | B1* | 11/2017 | McDonald | G06Q 30/0276 |
| 9,959,037 | B2* | 5/2018 | Chaudhri | H04N 5/23293 |
| 10,021,061 | B1* | 7/2018 | Bastide | H04L 51/066 |
| 10,127,631 | B1* | 11/2018 | Duan | G06T 11/60 |
| 10,235,533 | B1* | 3/2019 | Thoren | G06F 16/26 |
| 10,374,987 | B2* | 8/2019 | Pola | G06Q 50/01 |
| 10,523,625 | B1* | 12/2019 | Allen | H04L 51/32 |
| 10,623,917 | B1* | 4/2020 | Paul | H04W 4/21 |
| 10,783,269 | B1* | 9/2020 | Shraer | H04L 9/3242 |
| 10,895,964 | B1* | 1/2021 | Grantham | G06F 3/0482 |
| 2007/0162432 | A1* | 7/2007 | Armstrong | G06F 16/9535 |
| 2012/0210200 | A1* | 8/2012 | Berger | G06F 3/0481 715/202 |
| 2012/0290950 | A1* | 11/2012 | Rapaport | H04N 21/8358 715/753 |
| 2013/0060877 | A1* | 3/2013 | Ku | H04L 51/16 709/206 |
| 2013/0117365 | A1* | 5/2013 | Padmanabhan | H04W 4/02 709/204 |
| 2013/0246525 | A1* | 9/2013 | Patil | G06Q 10/107 709/204 |

(Continued)

*Primary Examiner* — Blake J Rubin
(74) *Attorney, Agent, or Firm* — Schwegman Lundberg & Woessner, P.A.

(57) ABSTRACT

A method of managing electronic media content items starts with a server system receiving a first electronic communication from a first client device in communication with the server system over a network. The server system then generates a first media content item based on the first electronic communication and causes the first media content item to be displayed on a display screen of a second client device. The server system receives a request from the second client device to store the first media content item and stores the first media content item in a storage that is associated with the first user and the second user. The server system then generates a notification to be displayed on a display screen of the first client device that indicates the first media content item is stored in the storage. Other embodiments are disclosed herein.

20 Claims, 16 Drawing Sheets

(56) References Cited

U.S. PATENT DOCUMENTS

| | | | |
|---|---|---|---|
| 2013/0332856 A1* | 12/2013 | Sanders | G06F 3/0481 715/753 |
| 2015/0026604 A1* | 1/2015 | Mulukuri | H04L 51/32 715/758 |
| 2015/0121455 A1* | 4/2015 | Siegel | H04L 63/12 726/2 |
| 2016/0149956 A1* | 5/2016 | Birnbaum | H04L 63/101 726/1 |
| 2016/0294750 A1* | 10/2016 | Ansari | G06F 3/0485 |
| 2016/0359791 A1* | 12/2016 | Zhang | H04L 51/20 |
| 2017/0032021 A1* | 2/2017 | Watanachote | H04L 51/32 |
| 2017/0090704 A1* | 3/2017 | Hu | G06F 3/0484 |
| 2017/0118303 A1* | 4/2017 | Ratiu | G06Q 30/0244 |
| 2017/0124562 A1* | 5/2017 | Hessler | G06Q 20/0855 |
| 2017/0126592 A1* | 5/2017 | El Ghoul | H04L 51/04 |
| 2017/0168692 A1* | 6/2017 | Chandra | G06F 3/017 |
| 2017/0177643 A1* | 6/2017 | Franklin | G06F 16/23 |
| 2017/0192651 A1* | 7/2017 | Yang | H04L 67/306 |
| 2017/0201478 A1* | 7/2017 | Joyce | H04L 51/24 |
| 2017/0244774 A1* | 8/2017 | Trombetta | G06Q 50/01 |
| 2017/0251182 A1* | 8/2017 | Siminoff | G06T 7/70 |
| 2017/0364599 A1* | 12/2017 | Ohanyerenwa | H04L 67/2804 |
| 2017/0372042 A1* | 12/2017 | Isles | H04L 9/3236 |
| 2018/0013975 A1* | 1/2018 | Tang | H04N 5/77 |
| 2018/0032212 A1* | 2/2018 | Choi | H04L 63/10 |
| 2018/0048762 A1* | 2/2018 | Kats | H04M 1/2757 |
| 2018/0164986 A1* | 6/2018 | Al Majid | G06F 3/04845 |
| 2018/0183738 A1* | 6/2018 | Parnell | H04L 51/36 |
| 2018/0191805 A1* | 7/2018 | Hurwitz | H04L 67/26 |
| 2018/0246983 A1* | 8/2018 | Rathod | G06F 3/0482 |
| 2018/0262586 A1* | 9/2018 | Wang | H04L 51/32 |
| 2018/0268494 A1* | 9/2018 | Ahrens | G06Q 50/01 |
| 2018/0309801 A1* | 10/2018 | Rathod | H04L 67/141 |
| 2018/0343294 A1* | 11/2018 | Rands | G06F 16/24575 |
| 2018/0348970 A1* | 12/2018 | Chand | G06F 3/0482 |
| 2018/0351895 A1* | 12/2018 | Rathod | H04L 51/10 |
| 2018/0367495 A1* | 12/2018 | Kim | H04L 51/36 |
| 2019/0005419 A1* | 1/2019 | Howard | G06Q 10/06 |
| 2019/0121875 A1* | 4/2019 | Niu | H04L 67/06 |
| 2019/0132400 A1* | 5/2019 | Platt | H04W 76/14 |
| 2019/0132405 A1* | 5/2019 | Song | H04L 51/32 |
| 2020/0145358 A1* | 5/2020 | Yegorin | H04L 51/32 |
| 2020/0193482 A1* | 6/2020 | Howard | G06Q 30/0267 |

\* cited by examiner

SYSTEM AND METHOD OF MANAGING ELECTRONIC MEDIA CONTENT ITEMS

BACKGROUND

The popularity of electronic messaging, particularly instant messaging, continues to grow. Users increasingly share electronic media content items such as electronic images, audio, and video with each other. Users also increasingly utilize their mobile devices to communicate with each other using chat and message programs. Over time, a user may accumulate a large amount of media content associated with various events and time periods.

The popularity of electronic messaging, particularly instant messaging, continues to grow. Users increasingly share media content items such as electronic images and videos with each other, reflecting a global demand to communicate more visually.

Each messaging system is thus presented with the challenge of providing a graphical user interface that organizes and manages the large amount of media content items being exchanged between the network of individuals on the system.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings in which.

DETAILED DESCRIPTION

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

Among other things, embodiments of the present disclosure improve the functionality of electronic messaging software and systems by managing the electronic media content items associated with the users. Managing the media content items includes, for example, enabling a user to save or repost a media content item that either directly sent to the user ("direct message") or indirectly sent to the user (e.g., another user's broadcasted collection of media content item, or "stories"). Managing the media content items also includes generating and managing a storage space (e.g., a shared folder) associated with the user that generates or sends the media content item and the user that is the recipient of the media content item. Both users are able to edit, share or delete the media content items in the storage space.

Figure 1:
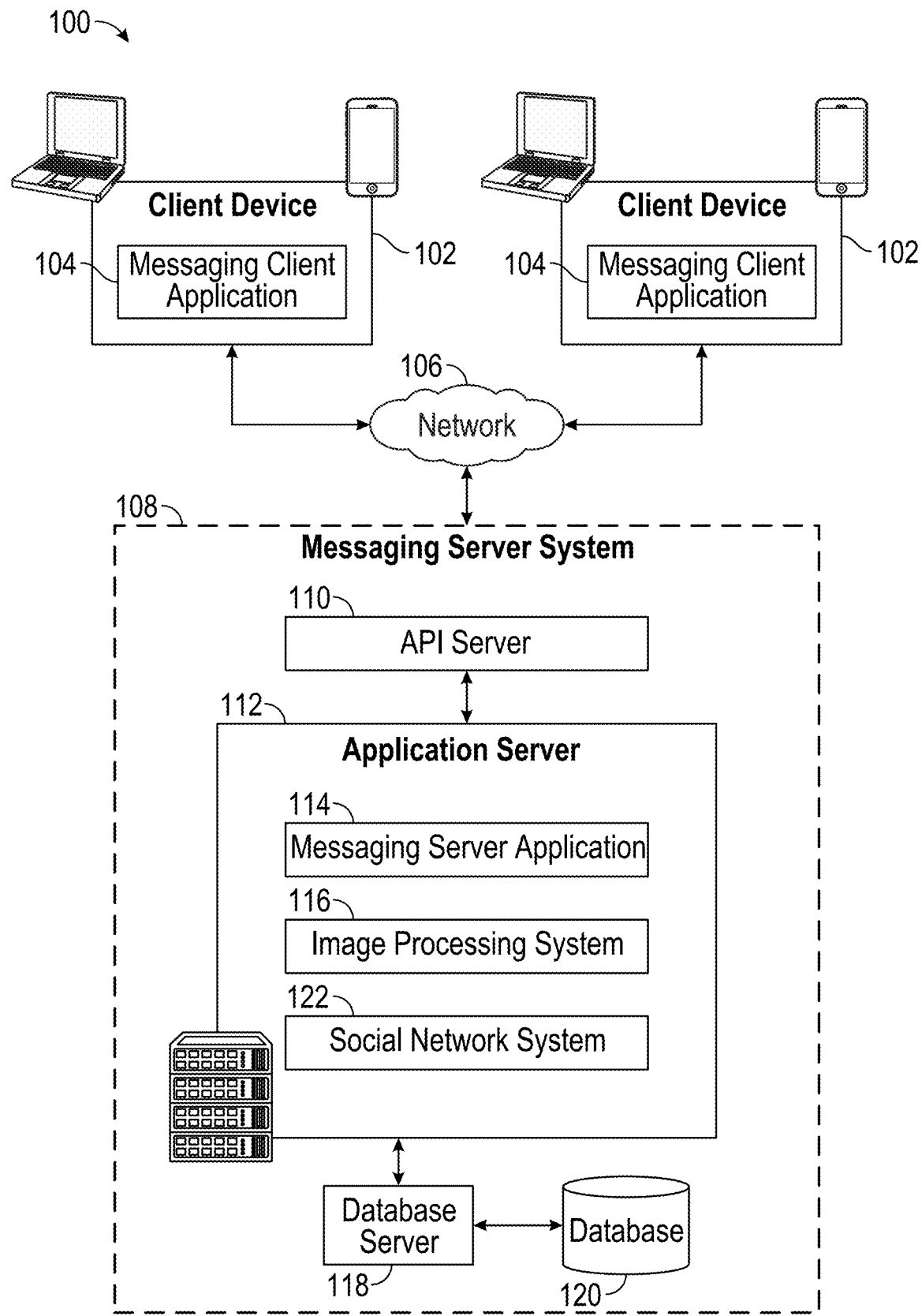
FIG. 1 is a block diagram showing an example messaging system for exchanging data (e.g., messages and associated content) over a network.

FIG. 1 is a block diagram showing an example of a messaging system 100 for exchanging data (e.g., messages and associated content) over a network. The messaging system 100 includes multiple client devices 102, each of which hosts a number of applications including a messaging client application 104. Each messaging client application 104 is communicatively coupled to other instances of the messaging client application 104 and a messaging server system 108 via a network 106 (e.g., the Internet). As used herein, the term "client device" may refer to any machine that interfaces to a communications network (such as network 106) to obtain resources from one or more server systems or other client devices. A client device may be, but is not limited to, a mobile phone, desktop computer, laptop, portable digital assistants (PDAs), smart phones, tablets, ultra books, netbooks, laptops, multi-processor systems, microprocessor-based or programmable consumer electronics, game consoles, set-top boxes, or any other communication device that a user may use to access a network.

In the example shown in FIG. 1, each messaging client application 104 is able to communicate and exchange data with another messaging client application 104 and with the messaging server system 108 via the network 106. The data exchanged between messaging client applications 104, and between a messaging client application 104 and the messaging server system 108, includes functions (e.g., commands to invoke functions) as well as payload data (e.g., text, audio, video or other multimedia data).

The network 106 may include, or operate in conjunction with, an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other type of cellular or wireless coupling. In this example, the coupling may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

The messaging server system 108 provides server-side functionality via the network 106 to a particular messaging client application 104. While certain functions of the messaging system 100 are described herein as being performed by either a messaging client application 104 or by the messaging server system 108, it will be appreciated that the location of certain functionality either within the messaging client application 104 or the messaging server system 108 is a design choice. For example, it may be technically preferable to initially deploy certain technology and functionality within the messaging server system 108, but to later migrate this technology and functionality to the messaging client application 104 where a client device 102 has a sufficient processing capacity.

The messaging server system 108 supports various services and operations that are provided to the messaging client application 104. Such operations include transmitting data to, receiving data from, and processing data generated by the messaging client application 104. This data may include, message content, client device information, geolocation information, media annotation and overlays, message content persistence conditions, social network information, and live event information, as examples. Data exchanges within the messaging system 100 are invoked and controlled through functions available via user interfaces (UIs) of the messaging client application 104.

Turning now specifically to the messaging server system 108, an Application Program Interface (API) server 110 is coupled to, and provides a programmatic interface to, an application server 112. The application server 112 is communicatively coupled to a database server 118, which facilitates access to a database 120 in which is stored data associated with messages processed by the application server 112.

Dealing specifically with the Application Program Interface (API) server 110, this server receives and transmits message data (e.g., commands and message payloads) between the client device 102 and the application server 112. Specifically, the Application Program Interface (API) server 110 provides a set of interfaces (e.g., routines and protocols) that can be called or queried by the messaging client application 104 in order to invoke functionality of the application server 112. The Application Program Interface (API) server 110 exposes various functions supported by the application server 112, including account registration, login functionality, the sending of messages, via the application server 112, from a particular messaging client application 104 to another messaging client application 104, the sending of electronic media files (e.g., electronic images or video) from a messaging client application 104 to the messaging server application 114, and for possible access by another messaging client application 104, the setting of a collection of media data (e.g., story), the retrieval of a list of friends of a user of a client device 102, the retrieval of such collections, the retrieval of messages and content, the adding and deletion of friends to a social graph, the location of friends within a social graph, opening and application event (e.g., relating to the messaging client application 104).

The application server 112 hosts a number of applications and subsystems, including a messaging server application 114, an image processing system 116 and a social network system 122. The messaging server application 114 implements a number of message processing technologies and functions, particularly related to the aggregation and other processing of content (e.g., textual and multimedia content including images and video clips) included in messages received from multiple instances of the messaging client application 104. As will be described in further detail, the text and media content from multiple sources may be aggregated into collections of content (e.g., called stories or galleries). These collections are then made available, by the messaging server application 114, to the messaging client application 104. Other processor and memory intensive processing of data may also be performed server-side by the messaging server application 114, in view of the hardware requirements for such processing.

The application server 112 also includes an image processing system 116 that is dedicated to performing various image processing operations, typically with respect to electronic images or video received within the payload of a message at the messaging server application 114.

The social network system 122 supports various social networking functions services, and makes these functions and services available to the messaging server application 114. To this end, the social network system 122 maintains and accesses an entity graph 304 within the database 120. Examples of functions and services supported by the social network system 122 include the identification of other users of the messaging system 100 with which a particular user has relationships or is "following", and also the identification of other entities and interests of a particular user.

The application server 112 is communicatively coupled to a database server 118, which facilitates access to a database 120 in which is stored data associated with messages processed by the messaging server application 114.

Some embodiments may include one or more wearable devices, such as a pendant with an integrated camera that is integrated with, in communication with, or coupled to, a client device 102. Any desired wearable device may be used in conjunction with the embodiments of the present disclosure, such as a watch, eyeglasses, goggles, a headset, a wristband, earbuds, clothing (such as a hat or jacket with integrated electronics), a clip-on electronic device, or any other wearable devices.

Figure 2:
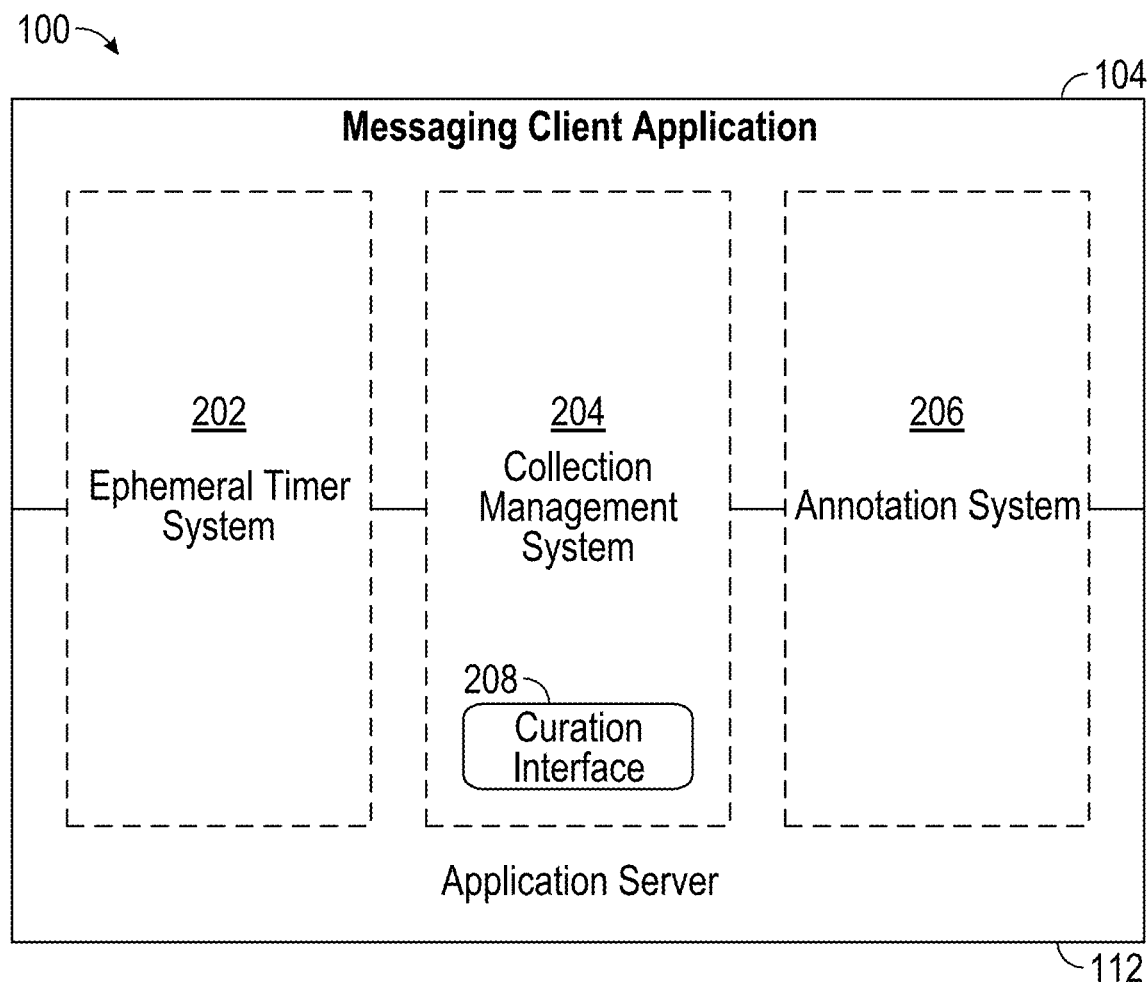
FIG. 2 is block diagram illustrating further details regarding a messaging system, according to exemplary embodiments.

FIG. 2 is block diagram illustrating further details regarding the messaging system 100, according to exemplary embodiments. Specifically, the messaging system 100 is shown to comprise the messaging client application 104 and the application server 112, which in turn embody a number of some subsystems, namely an ephemeral timer system 202, a collection management system 204 and an annotation system 206.

The ephemeral timer system 202 is responsible for enforcing the temporary access to content permitted by the messaging client application 104 and the messaging server application 114. To this end, the ephemeral timer system 202 incorporates a number of timers that, based on duration and display parameters associated with a message, or collection of messages (e.g., a SNAPCHAT® story), selectively display and enable access to messages and associated content via the messaging client application 104.

The collection management system 204 is responsible for managing collections of media (e.g., collections of text, image, video and audio data). In some examples, a collection of content (e.g., messages, including images, video, text, and audio) may be organized into an "event gallery" or an "event story." Such a collection may be made available for a specified time period, such as the duration of an event to which the content relates. For example, content relating to a music concert may be made available as a "story" for the duration of that music concert. The collection management system 204 may also be responsible for publishing an icon that provides notification of the existence of a particular collection to the user interface of the messaging client application 104.

The collection management system 204 furthermore includes a curation interface 208 that allows a collection manager to manage and curate a particular collection of content. For example, the curation interface 208 enables an event organizer to curate a collection of content relating to a specific event (e.g., delete inappropriate content or redundant messages). Additionally, the collection management system 204 employs machine vision (or image recognition technology) and content rules to automatically curate a content collection. In certain embodiments, compensation may be paid to a user for inclusion of user generated content into a collection. In such cases, the curation interface 208 operates to automatically make payments to such users for the use of their content.

The annotation system 206 provides various functions that enable a user to annotate or otherwise modify or edit media content associated with a message. For example, the annotation system 206 provides functions related to the generation and publishing of media overlays for messages processed by the messaging system 100. The annotation system 206 operatively supplies a media overlay (e.g., a SNAPCHAT® filter) to the messaging client application 104 based on a geolocation of the client device 102. In another example, the annotation system 206 operatively supplies a media overlay to the messaging client application 104 based on other information, such as, social network information of the user of the client device 102. A media overlay may include audio and visual content and visual effects. Examples of audio and visual content include pictures, texts, logos, animations, and sound effects. An example of a visual effect includes color overlaying. The audio and visual content or the visual effects can be applied to a media content item (e.g., an image or video) at the client device 102. For example, the media overlay including text that can be overlaid on top of a photograph/electronic image generated by the client device 102. In another example, the media overlay includes an identification of a location overlay (e.g., Venice beach), a name of a live event, or a name of a merchant overlay (e.g., Beach Coffee House). In another example, the annotation system 206 uses the geolocation of the client device 102 to identify a media overlay that includes the name of a merchant at the geolocation of the client device 102. The media overlay may include other indicia associated with the merchant. The media overlays may be stored in the database 120 and accessed through the database server 118.

In some exemplary embodiments, as discussed in more detail below, embodiments of the present disclosure may generate, display, distribute, and apply media overlays to media content items. For example, embodiments may utilize media content items generated by a client device 102 (e.g., an image or video captured using a digital camera coupled to the client device 102) to generate media overlays that can be applied to other media content items.

Figure 3:
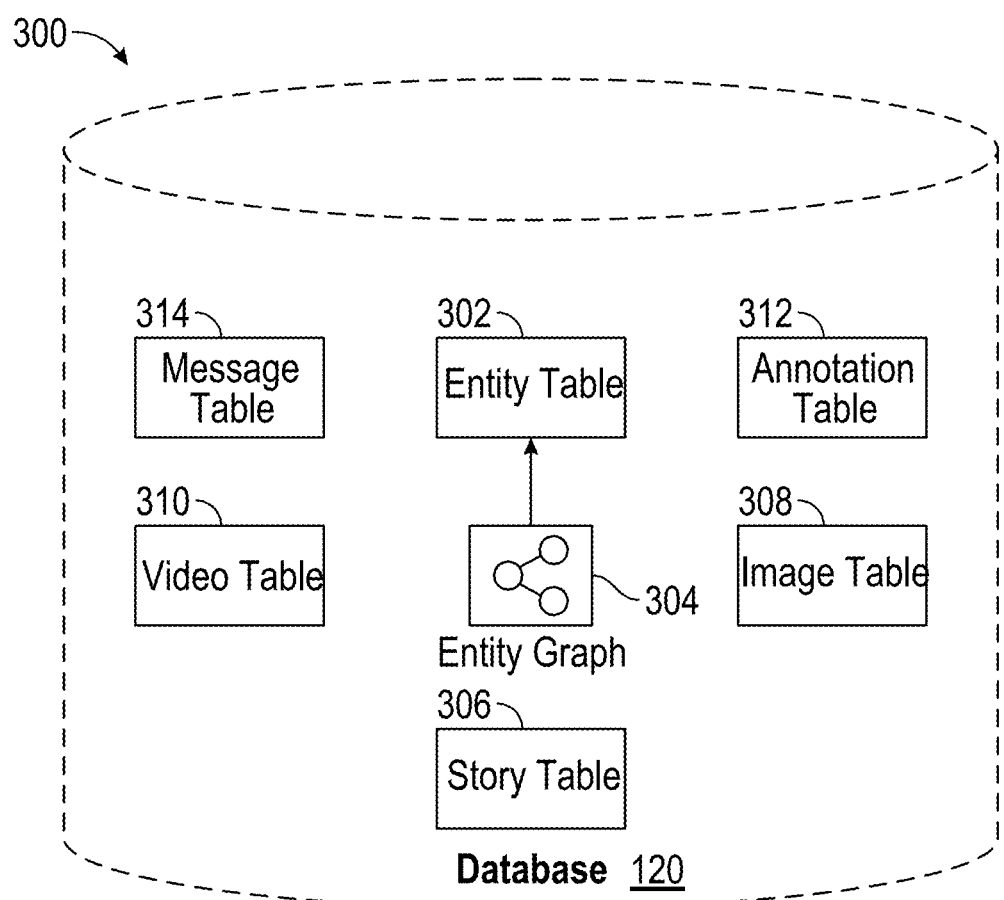
FIG. 3 is a schematic diagram illustrating data which may be stored in the database of the messaging server system, according to various exemplary embodiments.

FIG. 3 is a schematic diagram 300 illustrating data 300 that is stored in the database 120 of the messaging server system 108, according to certain exemplary embodiments. While the content of the database 120 is shown to comprise a number of tables, the data could be stored in other types of data structures (e.g., as an object-oriented database).

The database 120 includes message data stored within a message table 314. The entity table 302 stores entity data, including an entity graph 304. Entities for which records are maintained within the entity table 302 may include individuals, corporate entities, organizations, objects, places, events etc. Regardless of type, any entity regarding which the messaging server system 108 stores data may be a recognized entity. Each entity is provided with a unique identifier, as well as an entity type identifier (not shown).

The entity graph 304 furthermore stores information regarding relationships and associations between entities. Such relationships may be social, professional (e.g., work at a common corporation or organization) interested-based or activity-based, merely for example.

The database 120 also stores annotation data, in the example form of filters, in an annotation table 312. Filters for which data is stored within the annotation table 312 are associated with and applied to videos (for which data is stored in a video table 310) or images (for which data is stored in an image table 308). Filters, in one example, are overlays that are displayed as overlaid on an image or video during presentation to a recipient user. Filters may be of varies types, including a user-selected filters from a gallery of filters presented to a sending user by the messaging client application 104 when the sending user is composing a message.

Other types of filters include geolocation filters (also known as Geofilters) which may be presented to a sending user based on geographic location. For example, geolocation filters specific to a neighborhood or special location may be presented within a user interface by the messaging client application 104, based on geolocation information determined by a GPS unit of the client device 102. Another type of filter is a data filter, which may be selectively presented to a sending user by the messaging client application 104, based on other inputs or information gathered by the client device 102 during the message creation process. Example of data filters include current temperature at a specific location, a current speed at which a sending user is traveling, battery life for a client device 102 or the current time. Other annotation data that may be stored within the image table 308 is so-called "Lens" data. A "Lens" may be a real-time special effect and sound that may be added to an image or a video.

As mentioned above, the video table 310 stores video data which, in one embodiment, is associated with messages for which records are maintained within the message table 314. Similarly, the image table 308 stores image data associated with messages for which message data is stored in the entity table 302. The entity table 302 may associate various annotations from the annotation table 312 with various images and videos stored in the image table 308 and the video table 310.

A story table 306 stores data regarding collections of messages and associated image, video or audio data, which are compiled into a collection (e.g., a SNAPCHAT® story or a gallery). The creation of a particular collection may be initiated by a particular user (e.g., each user for which a record is maintained in the entity table 302). A user may create a "personal story" in the form of a collection of content that has been created and sent/broadcast by that user. To this end, the user interface of the messaging client application 104 may include an icon that is user selectable to enable a sending user to add specific content to his or her personal story.

A collection may also constitute a "live story," which is a collection of content from multiple users that is created manually, automatically or using a combination of manual and automatic techniques. For example, a "live story" may constitute a curated stream of user-submitted content from varies locations and events. Users, whose client devices have location services enabled and are at a common location event at a particular time may, for example, be presented with an option, via a user interface of the messaging client application 104, to contribute content to a particular live story. The live story may be identified to the user by the messaging client application 104, based on his or her location. The end result is a "live story" told from a community perspective.

A further type of content collection is known as a "location story," which enables a user whose client device 102 is located within a specific geographic location (e.g., on a college or university campus) to contribute to a particular collection. In some embodiments, a contribution to a location story may require a second degree of authentication to verify that the end user belongs to a specific organization or other entity (e.g., is a student on the university campus).

Embodiments of the present disclosure may generate and present customized images for use within electronic messages/communications such as short message service (SMS) or multimedia message service (MMS) texts and emails. The customized images may also be utilized in conjunction with the SNAPCHAT stories, SNAPCHAT filters, and ephemeral messaging functionality discussed herein. Embodiments of the present disclosure may transmit and receive electronic communications containing media content items, media overlays, and/or other content (or links to such content as described below) using any form of electronic communication, such as SMS texts, MMS texts, emails, and other communications.

Figure 4:
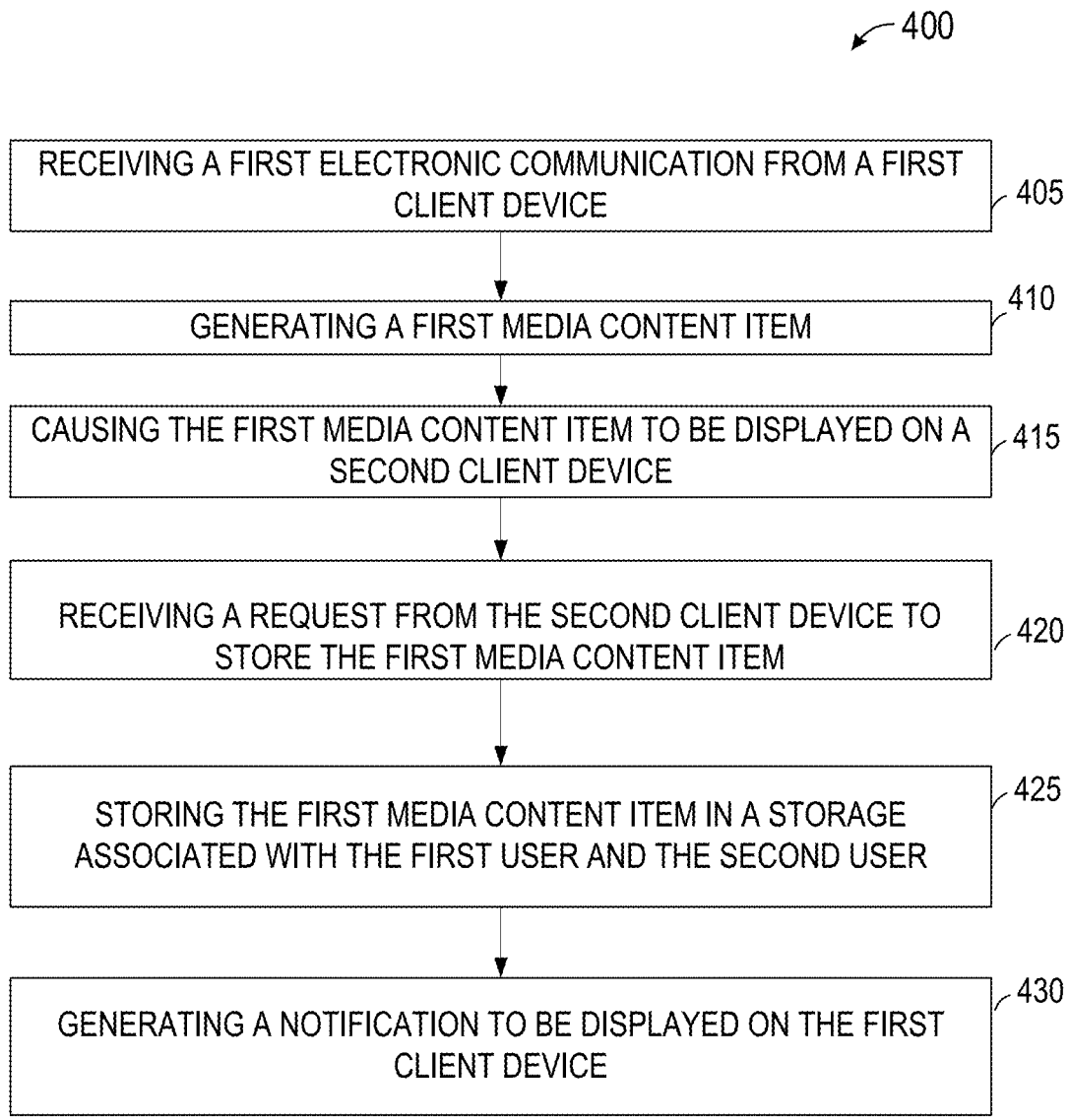
FIG. 4 is a flow diagram of an exemplary method of managing electronic media content items according to various aspects of the disclosure.

FIG. 4 depicts an exemplary method of managing electronic media content items according to various aspects of the present disclosure. The method 400 in FIG. 4 starts at Block 405 with the server system receiving from a first client device in communication with the server system over a network, a first electronic communication. The first client device is associated with a first user. The first electronic communication is generated by the first client device may be, for example, a direct electronic communication to the second client device ("direct message") or an electronic communication to a plurality of client devices in communication with the server system over the network ("stories"). The first electronic communication may include a text, picture, or video from the first client device. For example, the text may be inputted from a real or virtual keyboard coupled to the first electronic device or the picture or the video may be captured using a camera that is coupled to the first electronic device.

Figure 5A:
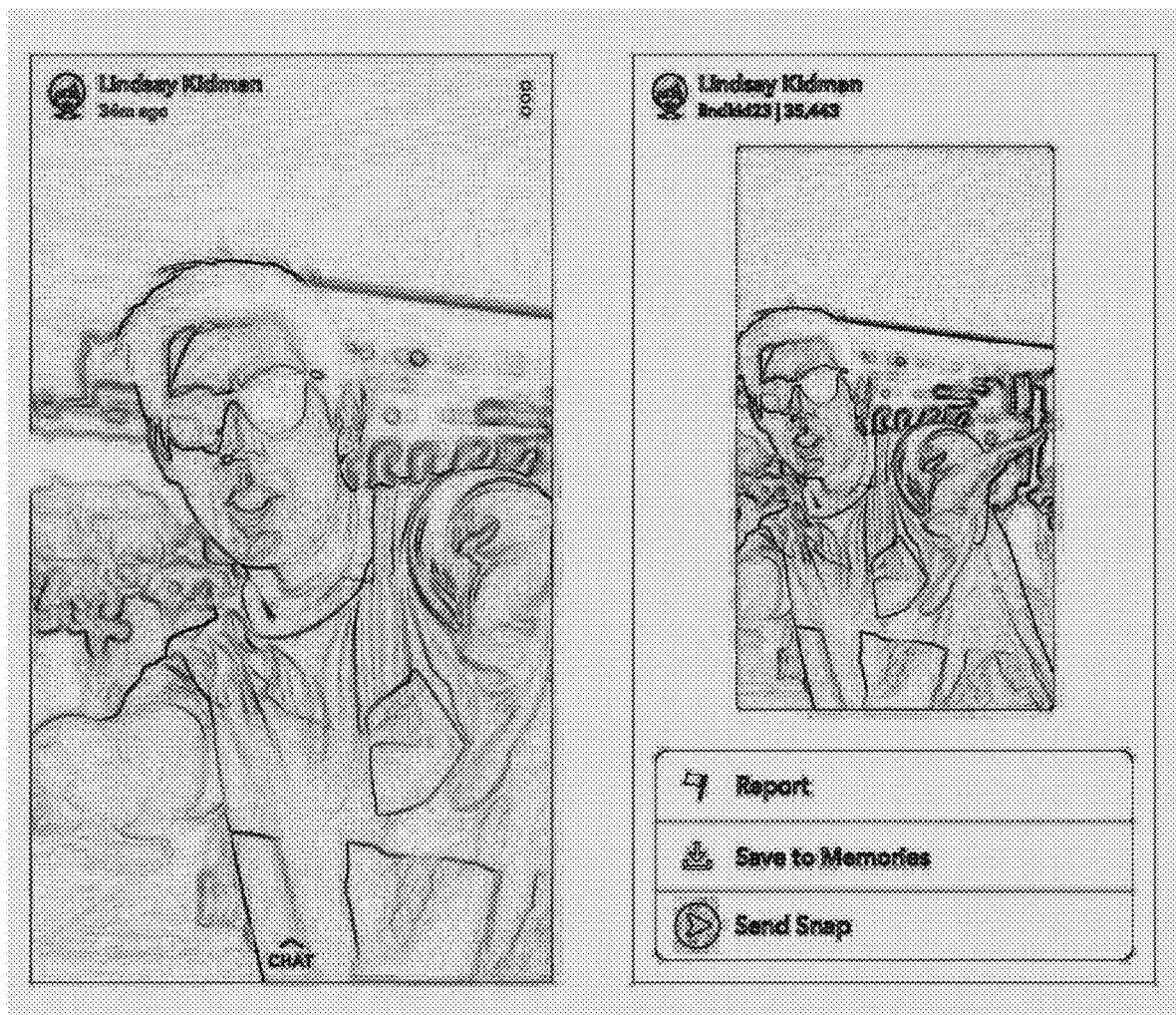
FIGS. 5A-5K are diagrams and screenshots illustrating various aspects of the present disclosure.

At Block 410, the server system generates a first media content item based on the first electronic communication. The first media content item may include, for example, the image or the video received from the first electronic device. At Block 415, the server system causes the first media content item to be displayed on a display screen of a second client device. The second client device is associated with a second user. In the left image in FIG. 5A, an example of a first media content item that is generated is illustrated. In the example in the left image of FIG. 5A, the first media content item that includes a picture is caused to be displayed on the second client device for the second user to view (e.g., recipient). The first media content item may also include at the top left the name of the first user (e.g., sender) and a time at which the first media content item was sent (e.g., 34 minutes ago).

Figure 5B:
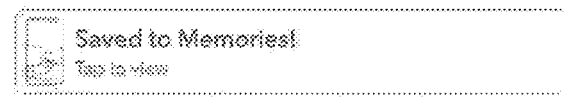
Figure 5C:
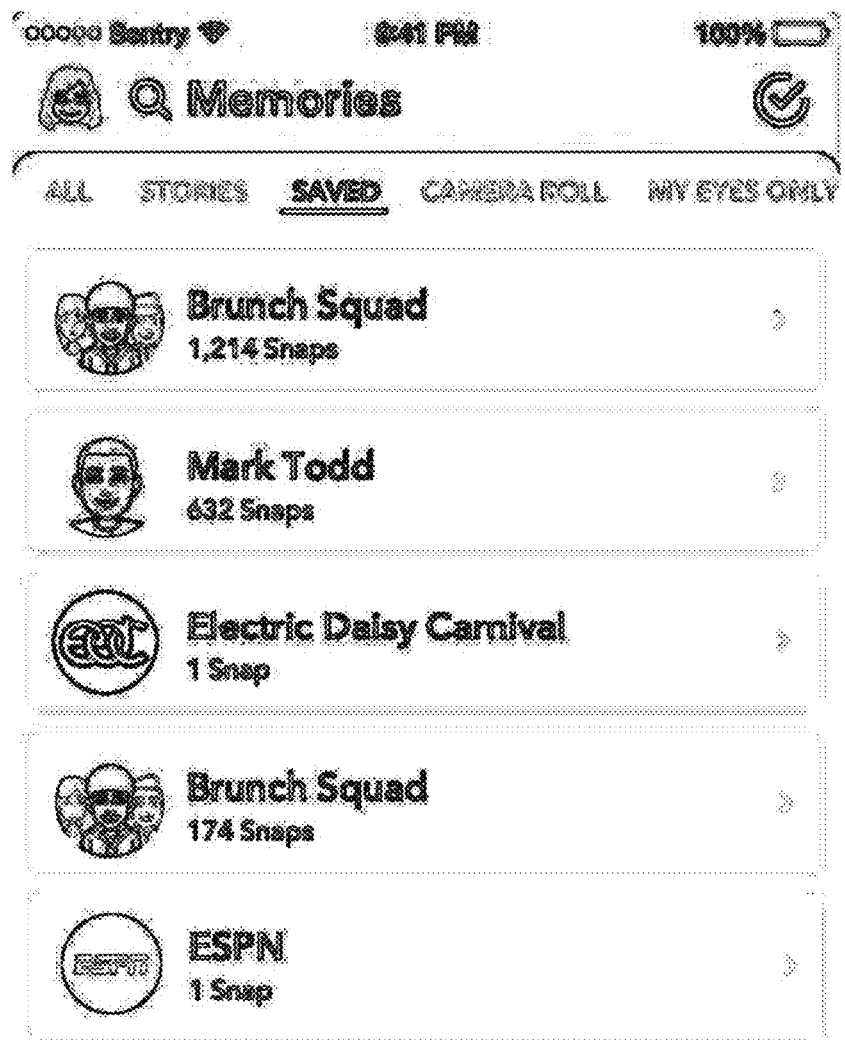
Figure 5D:
Figure 5E:
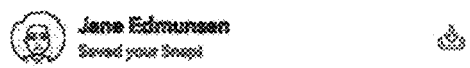
Figure 5F:
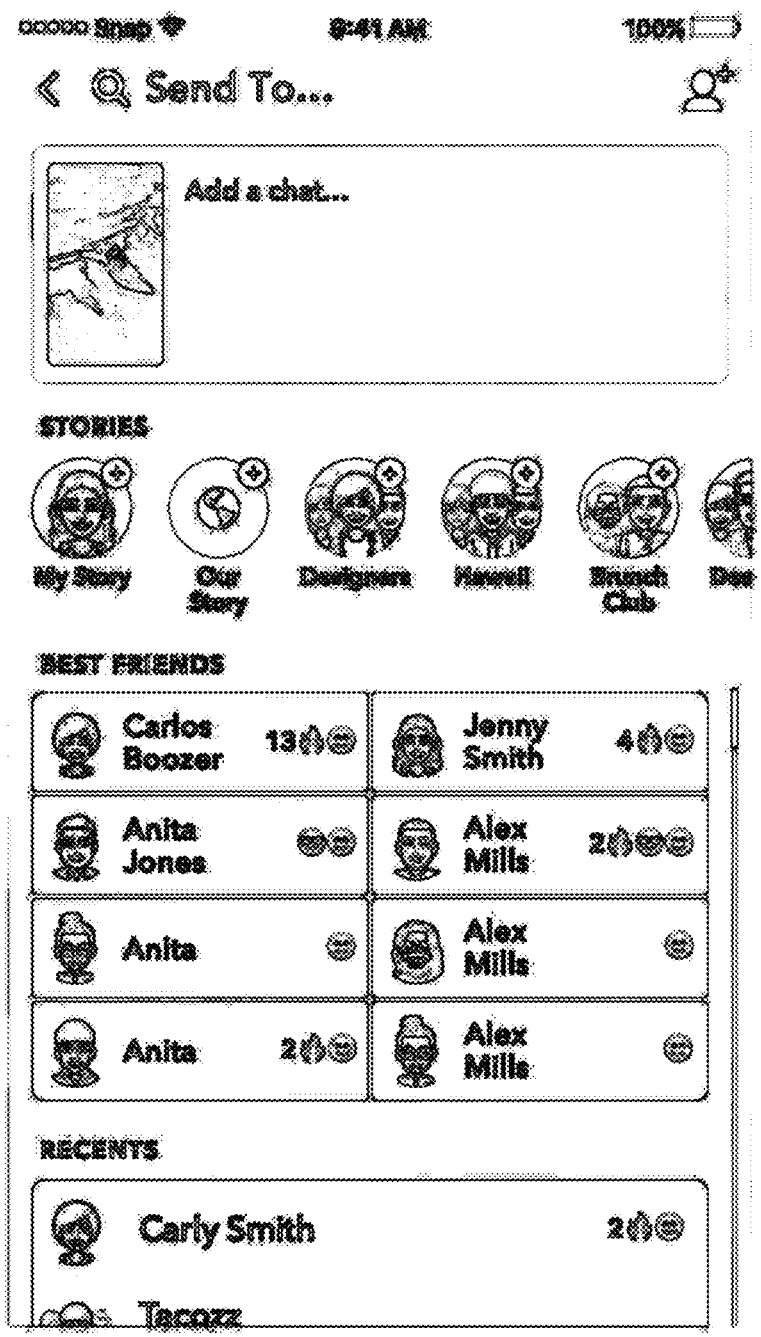
Figure 5G:
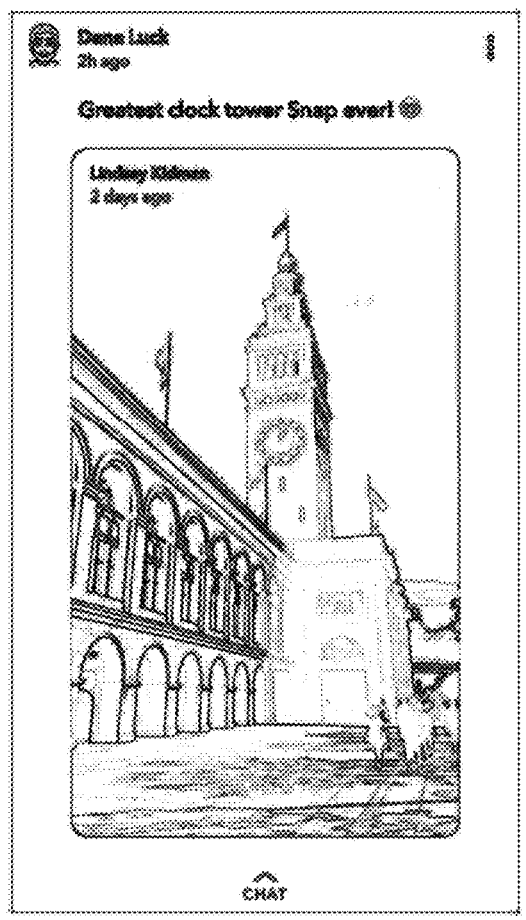
Figure 5G:
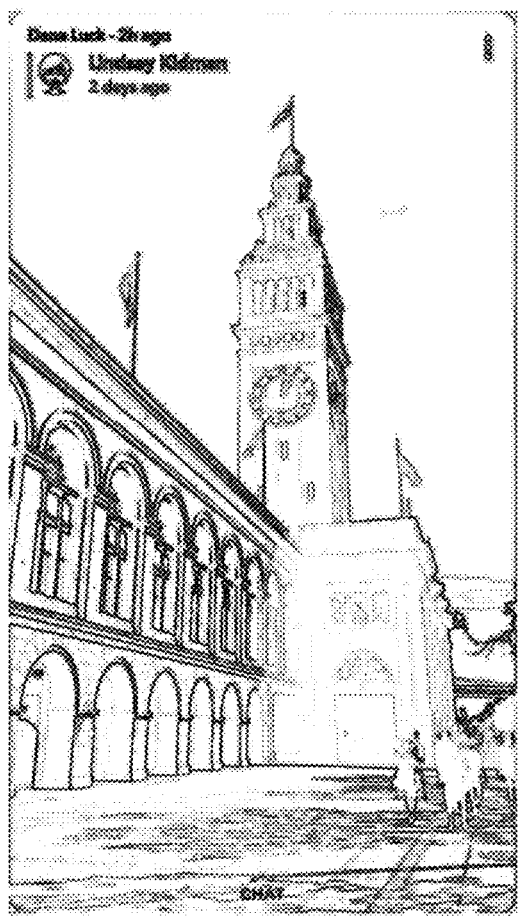
Figure 5H:
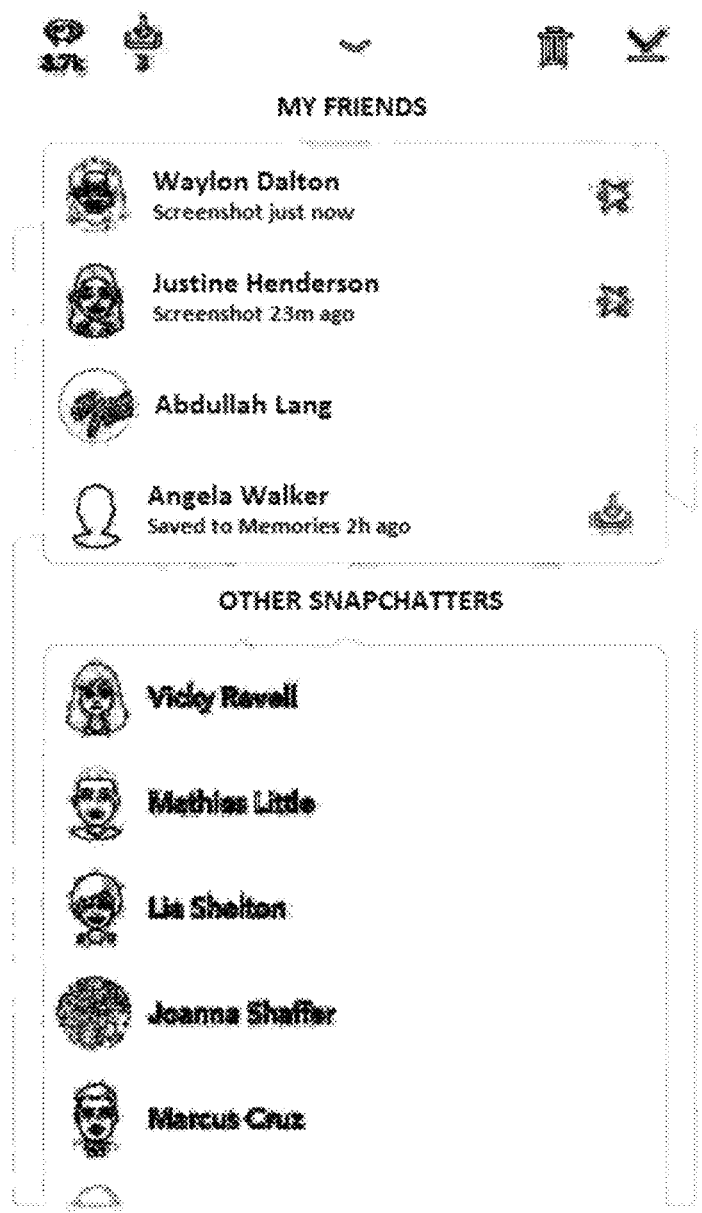
Figure 5I:
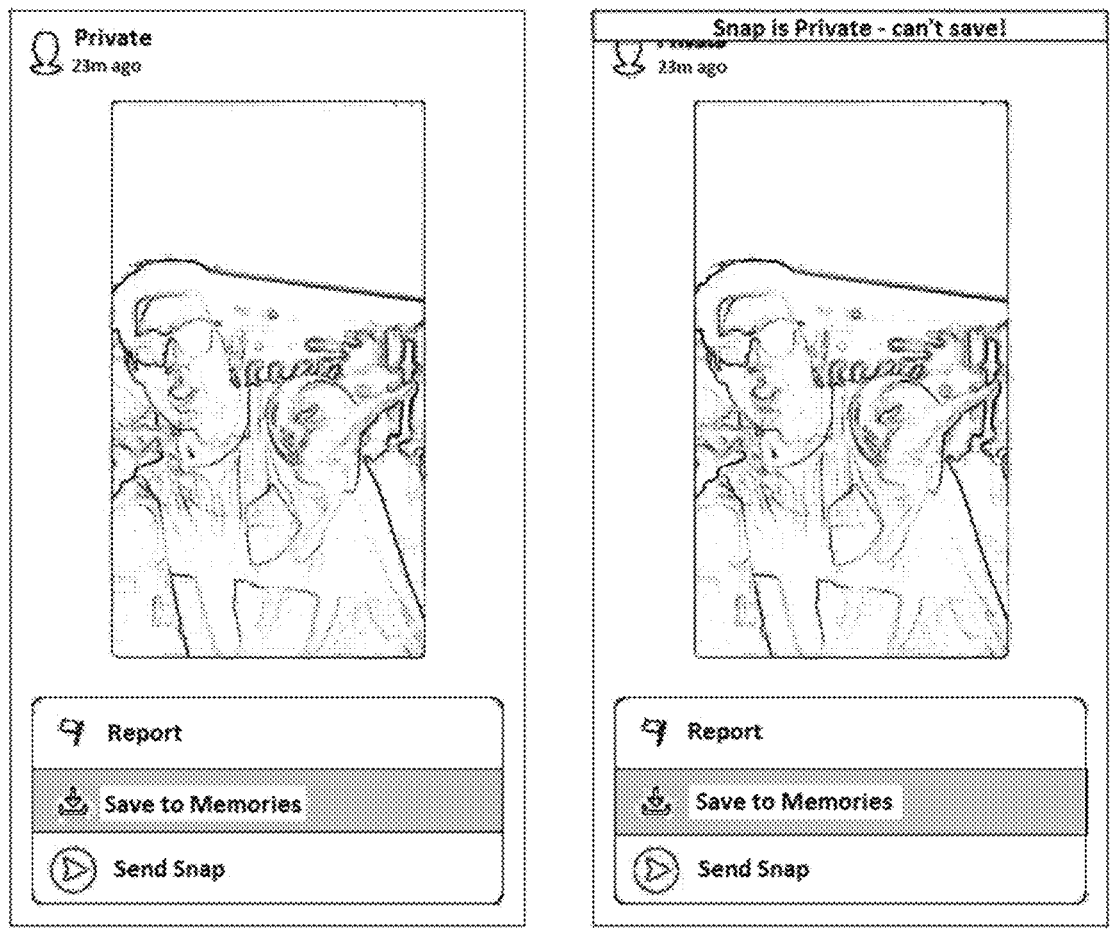

At Block 420, the server system receives a request from the second client device to store the first media content item. The request from the second client device may be generated when the second client device receives a selection input on the display screen displaying the first media content item from the second user. As shown in the left image in FIG. 5A, the second user may have selected a menu item (e.g., the vertical dots on the top right side of the image) to cause the user interface display in the right image in FIG. 5A to be generated on the second client device. In the right image in FIG. 5A, an exemplary user interface including a smaller (resized) version of the first media content item and a menu including options to the second user to report or flag the first media content item as inappropriate to the server system, to save the first media content item to a storage, or to send (or repost) the first media content item to one or more other users in the network. The second user may select the save option from the menu to store the first media content item. This selection generates the request that is received by the server system at Block 420. The server system may cause a notification to be generated on the display screen of the second client device which indicates that the first media content item is successfully saved to the storage. In FIG. 5B, an example of the notification being generated on the display screen of the second client device that indicates that the content was successfully saved to the storage is shown. In one embodiment, when the first user's settings in the server system includes a privacy setting that does not allow for the second user to save the first media content item, the server system may cause a notification to appear on the second client device that indicates that the first media content item cannot be saved to the storage. The right image in FIG. 5I illustrates an example of the user interface displayed on the second client device that includes the notification. As shown in FIG. 5I, the server system may also cause the menu item that is associated with the option of saving the first media content item to storage to indicate that it is not an available option (e.g., displaying "Save to Memories" in a lighter font or graying out the background of the "Save to Memories" option).

At Block 425, the server system stores the first media content item in a storage that is associated with the first user and the second user. FIG. 5C illustrates an example of the user interface displayed on the second client device that includes a list of groups (e.g., "Brunch Squad") or individuals (e.g., "Mark Todd") with which the second user shares storages of media content items. As shown in FIG. 5C, in one embodiment, the storages that are shared appear in tab (e.g., "saved" tab). In some embodiments, the storage associated with the first user and the second user will appear in the saved tab on the first client device and the second client device, respectively. Accordingly, both clients are able to view the media content items that were stored in the storage.

At Block 430, the server system generates a notification to be displayed on a display screen of the first client device that indicates the first media content item is stored in the storage. The notification to be displayed on the display screen of the first client device further indicates that the first media content item is stored by the second user. In FIG. 5E, an example of the notification being generated on the display screen of the first client device is shown.

In one embodiment, the server system may receive a request to access the storage from the first client device or the second client device and the server system may cause a preview of the media content items stored in the storage to be displayed on the display screen of the first client device or the display screen of the second client device. For example, if the request to access the storage is received from the first user using the first client device, the server system may cause a preview of the media content items in the storage to be displayed on the first client device's display screen to be viewed by the first user. For example, the preview of the media content item may be a gallery including thumbnail views (or smaller format views) of each of the media content items. FIG. 5D illustrates an example of a user interface displayed on the first client device that includes previews of the content media items that are stored in a shared storage. The media content items in the storage includes the first media content item that was stored at Block 425 by the server system. Accordingly, the preview of the media content items in the storage includes a smaller format view of the first media content item in a gallery.

In this embodiment, the server system may receive a request to access the first media content item from the first client device. For example, the first user may select the first media content item by selecting the smaller format view of the first media content item in the gallery. The first user's selection of the first media content causes the request to access the first media content item to be sent to the server system. The server system may then cause the first media content item to be displayed on the first client device.

Figure 5J:
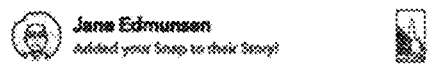
Figure 5K:
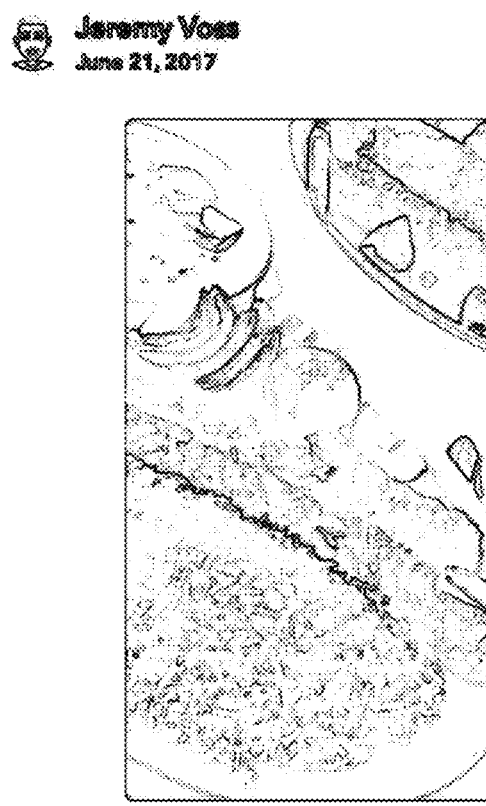
Figure 5K:
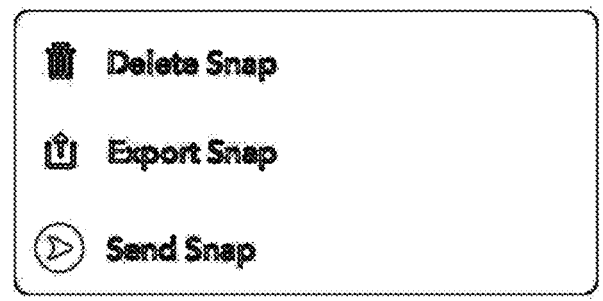

In one embodiment, the server system may receive a request to delete the first media content item from the first client device and the server system may cause the first media content item to be deleted from the storage. Once the first media content item is deleted from the storage, the second client device cannot access the first media content item from the storage. In FIG. 5K, an example of a user interface displayed on the first client device is illustrated. As shown in FIG. 5K, the user interface may include the first media content item selected from the storage and menu items including the option to delete the first media content item. When the first user selects the option to delete the first media content item, the server system may cause the content item to be deleted from the storage. In some embodiments, the server system causes a notification to be displayed on the first client device which indicates that once the first media content item is deleted from the storage, the second client device cannot access the first media content item from the storage. The notification may also include a selectable element to allow the first user to confirm the deletion or cancel the deletion request. As shown in FIG. 5K, the user interface may also include in the menu an option to export the first media content item. By selecting the option to export the first media content item, the first user may, for example, save the first media content item to the first computing device's local storage.

In one embodiment, the server system receives a request to access the first media content item from the second client device, and the server system causes the first media content item to be displayed on the second client device. The server system may receive a request to post the first media content item from the second client device. Referring back to the right image in FIG. 5A, the second user may select from the menu the option to send the first media content item. This selection causes the server system to receive the request to post the first media content item from the second client device. In response to receiving the request to post the first media content item from the second client device, the server system may cause a user interface to be displayed on the second client device as shown in FIG. 5F. The user interface in FIG. 5F includes the preview of the first media content item (e.g., top left), a text input box to receive text input from the second user, and selectable elements corresponding to the desired recipient or recipients of the first media content item. As shown in FIG. 5F, the second user may select to send the first media content item as a direct message to another user (e.g., individuals listed under "Best Friends") or to a plurality of users in communication with the server system over the network (e.g., options listed under "Stories"). In FIG. 5F, the second user has the option to post the first media content to a group of individuals (e.g., "Hawaii" or "Designers" Groups) as a story. In one embodiment, the server system may cause a notification to be displayed on the first client device that indicates when the second user has posted the first media content to a group of individuals (e.g., "My Story") as shown in the example notification illustrated in FIG. 5J.

In one embodiment, the server system may generate an altered first media content item. FIG. 5G illustrates examples of the user interfaces displayed on the second client device that include the altered first media content item. In the both images in FIG. 5G, the altered first media content item includes in the top left corner the name associated with the second user that is sending the first media content item and a time at which the second user sent the first media content item. In this example, the name associated with the first user that originally generated and/or sent the first media content item remains in the top left corner of the first media content item. The time at which the first user sent the first media content item may also be included in the altered first media content item as shown in the images in FIG. 5G. In other examples, the name associated with the first user may be removed or indicated as private based on the settings of the first user in the server system.

In one embodiment, the server system generates the altered first media content item by resizing the first media content item. The server system may also generate the altered first media content item by receiving an edit to the first media content item from the second client device. In this embodiment, the altered first media content item includes the edit to the first media content item. In the left image of FIG. 5G, the altered first media content item is a resized version of the first media content item and includes an edit to the first media content item that is a text input (e.g., "Greatest Clock Tower Snap Ever!"). The edit to the first media content item may be based on an input on the display screen displaying the first media content item from the second user.

The server system may cause the altered first media content item to be displayed on the display screen of the first client device or a third client device. The third client device is associated with a third user. In one example, the third user is selected by the second user via the exemplary user interface in FIG. 5F. For example, the second user may select to send the first media content item as a direct message to the third user (e.g., individuals listed under "Best Friends") or a group of users via "stories" to which the third user is a member (e.g., "My Story" or "Designers"). In one embodiment, when the third user views the altered first media content item on the third client device, the third user may choose to share the altered first media content item as a direct message to other users or to a group of users via the third user's stories. Referring back to FIG. 5G, in some embodiments, when the third user chooses the share the altered first media item, a name associated with the third user will appear at the top left corner as the sender of the altered first media item. In one embodiment, the name associated with the first user who sent the first media item may remain at the top left corner as the originator of the first media item.

When the second user selects to share the first media content item as a story to a group of users via the user interface in FIG. 5F, the second user may also request to view the activity associated with the first media content item. FIG. 5H illustrates an example of a user interface that may displayed on the second client device to indicate activity on the first media content item. As shown in FIG. 5H, the users that have viewed the first media content item are listed, the users who have taken screenshots of the first media content item are identified, and the users who have saved the first media content item to a storage shared with the second user are identified. For example, in FIG. 5H, the user Angela Walker is shown to have saved the first media content item to the storage shared between her and the second user.

When the second user selects to share the first media content item to a group of users via the user interface in FIG. 5F, the server system may automatically save the first media content item in a storage associated with each of the users in the group of users (e.g., "Designers"). The settings associated with each user may indicate whether the user wishes to have the media content items automatically saved to the storage associated with the group of users. In some embodiments, the media content items in the storage associated with each of the users in the group of users may also be exported onto one of the user's computing device. Referring back to FIG. 5K, the user may request to export the media content item by selecting the exporting option from the menu on the user interface. Upon receiving this request, the server system may export the media content item to the user's computing device or to a storage associated with the user.

Software Architecture

Figure 6:
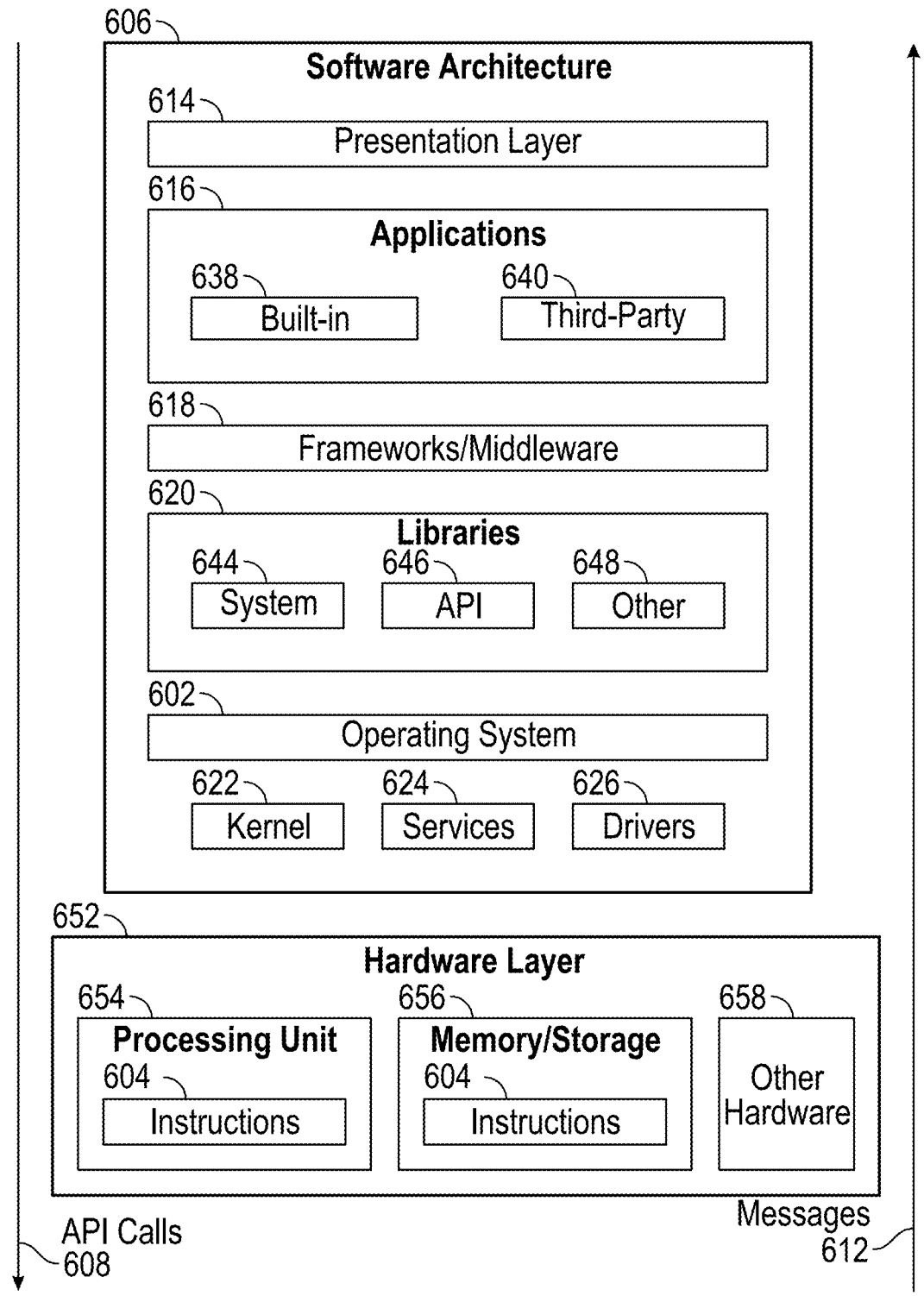
FIG. 6 is a block diagram illustrating a representative software architecture, which may be used in conjunction with various hardware architectures herein described.

FIG. 6 is a block diagram illustrating an exemplary software architecture 606, which may be used in conjunction with various hardware architectures herein described. FIG. 6 is a non-limiting example of a software architecture and it will be appreciated that many other architectures may be implemented to facilitate the functionality described herein. The software architecture 606 may execute on hardware such as machine 700 of FIG. 7 that includes, among other things, processors 704, memory 714, and I/O components 718. A representative hardware layer 652 is illustrated and can represent, for example, the machine 700 of FIG. 7. The representative hardware layer 652 includes a processing unit 654 having associated executable instructions 604. Executable instructions 604 represent the executable instructions of the software architecture 606, including implementation of the methods, components and so forth described herein. The hardware layer 652 also includes memory or storage modules memory/storage 656, which also have executable instructions 604. The hardware layer 652 may also comprise other hardware 658.

As used herein, the term "component" may refer to a device, physical entity or logic having boundaries defined by function or subroutine calls, branch points, application program interfaces (APIs), or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions.

Components may constitute either software components (e.g., code embodied on a machine-readable medium) or hardware components. A "hardware component" is a tangible unit capable of performing certain operations and may be configured or arranged in a certain physical manner. In various exemplary embodiments, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations.

A hardware component may be a special-purpose processor, such as a Field-Programmable Gate Array (FPGA) or an Application Specific Integrated Circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software) may be driven by cost and time considerations.

A processor may be, or in include, any circuit or virtual circuit (a physical circuit emulated by logic executing on an actual processor) that manipulates data values according to control signals (e.g., "commands", "op codes", "machine code", etc.) and which produces corresponding output signals that are applied to operate a machine. A processor may, for example, be a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC) or any combination thereof. A processor may further be a multi-core processor having two or more independent processors (sometimes referred to as "cores") that may execute instructions contemporaneously.

Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In embodiments in which multiple hardware components are configured or instantiated at different times, communications between such hardware components may be achieved, for example, through the storage and retrieval of information in memory structures to which the multiple hardware components have access.

For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components.

Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)). The performance of certain of the operations may be distributed among the processors, not only residing within a single machine, but deployed across a number of machines. In some exemplary embodiments, the processors or processor-implemented components may be located in a single geographic location (e.g., within a home environment, an office environment, or a server farm). In other exemplary embodiments, the processors or processor-implemented components may be distributed across a number of geographic locations.

In the exemplary architecture of FIG. 6, the software architecture 606 may be conceptualized as a stack of layers where each layer provides particular functionality. For example, the software architecture 606 may include layers such as an operating system 602, libraries 620, applications 616 and a presentation layer 614. Operationally, the applications 616 or other components within the layers may invoke application programming interface (API) API calls 608 through the software stack and receive messages 612 in response to the API calls 608. The layers illustrated are representative in nature and not all software architectures have all layers. For example, some mobile or special purpose operating systems may not provide a frameworks/middleware 618, while others may provide such a layer. Other software architectures may include additional or different layers.

The operating system 602 may manage hardware resources and provide common services. The operating system 602 may include, for example, a kernel 622, services 624 and drivers 626. The kernel 622 may act as an abstraction layer between the hardware and the other software layers. For example, the kernel 622 may be responsible for memory management, processor management (e.g., scheduling), component management, networking, security settings, and so on. The services 624 may provide other common services for the other software layers. The drivers 626 are responsible for controlling or interfacing with the underlying hardware. For instance, the drivers 626 include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 620 provide a common infrastructure that is used by the applications 616 or other components or layers. The libraries 620 provide functionality that allows other software components to perform tasks in an easier fashion than to interface directly with the underlying operating system 602 functionality (e.g., kernel 622, services 624 or drivers 626). The libraries 620 may include system libraries 644 (e.g., C standard library) that may provide functions such as memory allocation functions, string manipulation functions, mathematical functions, and the like. In addition, the libraries 620 may include API libraries 646 such as media libraries (e.g., libraries to support presentation and manipulation of various media format such as MPREG4, H.264, MP3, AAC, AMR, JPG, PNG), graphics libraries (e.g., an OpenGL framework that may be used to render 2D and 3D in a graphic content on a display), database libraries (e.g., SQLite that may provide various relational database functions), web libraries (e.g., WebKit that may provide web browsing functionality), and the like. The libraries 620 may also include a wide variety of other libraries 648 to provide many other APIs to the applications 616 and other software components/modules.

The frameworks/middleware 618 (also sometimes referred to as middleware) provide a higher-level common infrastructure that may be used by the applications 616 or other software components/modules. For example, the frameworks/middleware 618 may provide various graphic user interface (GUI) functions, high-level resource management, high-level location services, and so forth. The frameworks/middleware 618 may provide a broad spectrum of other APIs that may be utilized by the applications 616 or other software components/modules, some of which may be specific to a particular operating system 602 or platform.

The applications 616 include built-in applications 638 or third-party applications 640. Examples of representative built-in applications 638 may include, but are not limited to, a contacts application, a browser application, a book reader application, a location application, a media application, a messaging application, or a game application. Third-party applications 640 may include an application developed using the ANDROID™ or IOS™ software development kit (SDK) by an entity other than the vendor of the particular platform, and may be mobile software running on a mobile operating system such as IOS™, ANDROID™, WINDOWS® Phone, or other mobile operating systems. The third-party applications 640 may invoke the API calls 608 provided by the mobile operating system (such as operating system 602) to facilitate functionality described herein.

The applications 616 may use built in operating system functions (e.g., kernel 622, services 624 or drivers 626), libraries 620, and frameworks/middleware 618 to create user interfaces to interact with users of the system. Alternatively, or additionally, in some systems interactions with a user may occur through a presentation layer, such as presentation layer 614. In these systems, the application/component "logic" can be separated from the aspects of the application/component that interact with a user.

Figure 7:
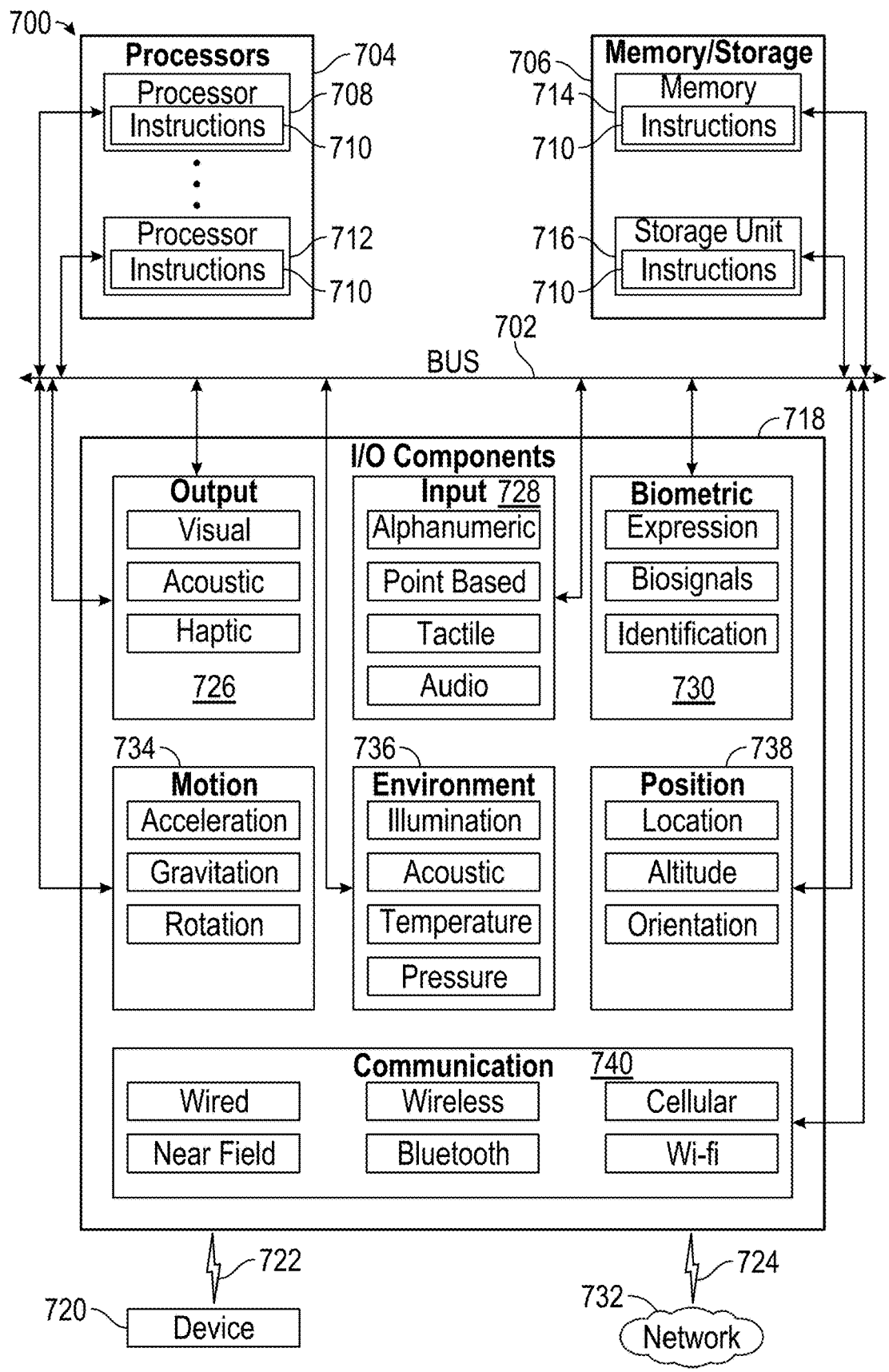
FIG. 7 is a block diagram illustrating components of a machine, according to some exemplary embodiments, able to read instructions from a machine-readable medium (e.g., a machine-readable storage medium) and perform any one or more of the methodologies discussed herein.

FIG. 7 is a block diagram illustrating components (also referred to herein as "modules") of a machine 700, according to some exemplary embodiments, able to read instructions from a machine-readable medium (e.g., a machine-readable storage medium) and perform any one or more of the methodologies discussed herein. Specifically, FIG. 7 shows a diagrammatic representation of the machine 700 in the example form of a computer system, within which instructions 710 (e.g., software, a program, an application, an applet, an app, or other executable code) for causing the machine 700 to perform any one or more of the methodologies discussed herein may be executed. As such, the instructions 710 may be used to implement modules or components described herein. The instructions 710 transform the general, non-programmed machine 700 into a particular machine 700 programmed to carry out the described and illustrated functions in the manner described. In alternative embodiments, the machine 700 operates as a standalone device or may be coupled (e.g., networked) to other machines. In a networked deployment, the machine 700 may operate in the capacity of a server machine or a client machine in a server-client network environment, or as a peer machine in a peer-to-peer (or distributed) network environment. The machine 700 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 710, sequentially or otherwise, that specify actions to be taken by machine 700. Further, while only a single machine 700 is illustrated, the term "machine" shall also be taken to include a collection of machines that individually or jointly execute the instructions 710 to perform any one or more of the methodologies discussed herein.

The machine 700 may include processors 704, memory memory/storage 706, and I/O components 718, which may be configured to communicate with each other such as via a bus 702. The memory/storage 706 may include a memory 714, such as a main memory, or other memory storage, and a storage unit 716, both accessible to the processors 704 such as via the bus 702. The storage unit 716 and memory 714 store the instructions 710 embodying any one or more of the methodologies or functions described herein. The instructions 710 may also reside, completely or partially, within the memory 714, within the storage unit 716, within at least one of the processors 704 (e.g., within the processor's cache memory), or any suitable combination thereof, during execution thereof by the machine 700. Accordingly, the memory 714, the storage unit 716, and the memory of processors 704 are examples of machine-readable media.

As used herein, the term "machine-readable medium," "computer-readable medium," or the like may refer to any component, device or other tangible media able to store instructions and data temporarily or permanently. Examples of such media may include, but is not limited to, random-access memory (RAM), read-only memory (ROM), buffer memory, flash memory, optical media, magnetic media, cache memory, other types of storage (e.g., Erasable Programmable Read-Only Memory (EEPROM)) or any suitable combination thereof. The term "machine-readable medium" should be taken to include a single medium or multiple media (e.g., a centralized or distributed database, or associated caches and servers) able to store instructions. The term "machine-readable medium" may also be taken to include any medium, or combination of multiple media, that is capable of storing instructions (e.g., code) for execution by a machine, such that the instructions, when executed by one or more processors of the machine, cause the machine to perform any one or more of the methodologies described herein. Accordingly, a "machine-readable medium" may refer to a single storage apparatus or device, as well as "cloud-based" storage systems or storage networks that include multiple storage apparatus or devices. The term "machine-readable medium" excludes signals per se.

The I/O components 718 may include a wide variety of components to provide a user interface for receiving input, providing output, producing output, transmitting information, exchanging information, capturing measurements, and so on. The specific I/O components 718 that are included in the user interface of a particular machine 700 will depend on the type of machine. For example, portable machines such as mobile phones will likely include a touch input device or other such input mechanisms, while a headless server machine will likely not include such a touch input device. It will be appreciated that the I/O components 718 may include many other components that are not shown in FIG. 7. The I/O components 718 are grouped according to functionality merely for simplifying the following discussion and the grouping is in no way limiting. In various exemplary embodiments, the I/O components 718 may include output components 726 and input components 728. The output components 726 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 728 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instrument), tactile input components (e.g., a physical button, a touch screen that provides location or force of touches or touch gestures, or other tactile input components), audio input components (e.g., a microphone), and the like. The input components 728 may also include one or more image-capturing devices, such as a digital camera for generating digital images or video.

In further exemplary embodiments, the I/O components 718 may include biometric components 730, motion components 734, environmental environment components 736, or position components 738, as well as a wide array of other components. One or more of such components (or portions thereof) may collectively be referred to herein as a "sensor component" or "sensor" for collecting various data related to the machine 700, the environment of the machine 700, a user of the machine 700, or a combinations thereof.

For example, the biometric components 730 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 734 may include acceleration sensor components (e.g., accelerometer), gravitation sensor components, velocity sensor components (e.g., speedometer), rotation sensor components (e.g., gyroscope), and so forth. The environment components 736 may include, for example, illumination sensor components (e.g., photometer), temperature sensor components (e.g., one or more thermometer that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 738 may include location sensor components (e.g., a Global Position system (GPS) receiver component), altitude sensor components (e.g., altimeters or barometers that detect air pressure from which altitude may be derived), orientation sensor components (e.g., magnetometers), and the like. For example, the location sensor component may provide location information associated with the system 700, such as the system's 700 GPS coordinates or information regarding a location the system 700 is at currently (e.g., the name of a restaurant or other business).

Communication may be implemented using a wide variety of technologies. The I/O components 718 may include communication components 740 operable to couple the machine 700 to a network 732 or devices 720 via coupling 722 and coupling 724 respectively. For example, the communication components 740 may include a network interface component or other suitable device to interface with the network 732. In further examples, communication components 740 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 720 may be another machine or any of a wide variety of peripheral devices (e.g., a peripheral device coupled via a Universal Serial Bus (USB)).

Moreover, the communication components 740 may detect identifiers or include components operable to detect identifiers. For example, the communication components 740 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 740, such as, location via Internet Protocol (IP) geo-location, location via Wi-Fi® signal triangulation, location via detecting a NFC beacon signal that may indicate a particular location, and so forth.

Where a phrase similar to "at least one of A, B, or C," "at least one of A, B, and C," "one or more A, B, or C," or "one or more of A, B, and C" is used, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources.

These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A method comprising:
   receiving, by a messaging server system, a first electronic communication from a first client device, wherein the first client device is associated with a first user;
   generating a first media content item based on the first electronic communication;
   causing the first media content item to be displayed on a display screen of a second client device, wherein the second client device is associated with a second user;
   receiving, by the server system, a request from the second client device to store the first media content item; and
   in response to the request from the second client device, storing the first media content item in a storage associated with the first user and the second user, the storage comprising a plurality of media content items stored by the first user and the second user, and
   generating a notification to be displayed on a display screen of the first client device that indicates the first media content item is stored in the storage associated with the first user and the second user.

2. The method of claim 1, wherein the request from the second client device is generated when the second client device receives a selection input on the display screen displaying the first media content item from the second user.

3. The method of claim 1, wherein the notification to be displayed on the display screen of the first client device further indicates that the first media content item is stored by the second user.

4. The method of claim 1, further comprising:
   receiving a request to access the storage from the first client device or the second client device; and
   causing a preview of a plurality of media content items stored in the storage to be displayed on the display screen of the first client device or the display screen of the second client device, wherein the plurality of media content items in the storage includes the first media content item.

5. The method of claim 4, further comprising:
receiving a request to access the first media content item from the first client device; and
causing the first media content item to be displayed on the first client device.

6. The method of claim 5, further comprising:
receiving a request to delete the first media content item from the first client device; and
causing the first media content item to be deleted from the storage, wherein once the first media content item is deleted from the storage, the second client device cannot access the first media content item from the storage.

7. The method of claim 4, further comprising:
receiving a request to access the first media content item from the second client device;
causing the first media content item to be displayed on the second client device;
receiving a request to post the first media content item from the second client device;
generating an altered first media content item, wherein generating the altered first media content item includes resizing the first media content item; and
causing the altered first media content item to be displayed on the display screen of the first client device or a third client device, wherein the third client device is associated with a third user.

8. The method of claim 7, wherein generating the altered first media content item further includes:
receiving an edit to the first media content item from the second client device, wherein the edit to the first media content item is based on an input on the display screen displaying the first media content item from the second user.

9. The method of claim 1, wherein the first electronic communication is generated by the first client device is at least one of:
a direct electronic communication to the second client device or an electronic communication to a plurality of client devices in communication with the server system over the network.

10. A non-transitory computer-readable storage medium having stored thereon, instructions when executed by a processor, causes a messaging server system to perform a method comprising:
receiving a first electronic communication from a first client device, wherein the first client device is associated with a first user;
generating a first media content item based on the first electronic communication;
causing the first media content item to be displayed on a display screen of a second client device, wherein the second client device is associated with a second user;
receiving a request from the second client device to store the first media content item; and
in response to the request from the second client device, storing the first media content item in a storage associated with the first user and the second user, the storage comprising a plurality of media content items stored by the first user and the second user, and
generating a notification to be displayed on a display screen of the first client device that indicates the first media content item is stored in the storage associated with the first user and the second user.

11. The non-transitory computer-readable storage medium of claim 10, wherein the request from the second client device is generated when the second client device receives a selection input on the display screen displaying the first media content item from the second user.

12. The non-transitory computer-readable storage medium of claim 10, wherein the notification to be displayed on the display screen of the first client device further indicates that the first media content item is stored by the second user.

13. The non-transitory computer-readable storage medium of claim 10, wherein the messaging server system to perform the method further comprising:
receiving a request to access the storage from the first client device or the second client device; and
causing a preview of a plurality of media content items stored in the storage to be displayed on the display screen of the first client device or the display screen of the second client device, wherein the plurality of media content items in the storage includes the first media content item.

14. The non-transitory computer-readable storage medium of claim 13, wherein the messaging server system to perform the method further comprising:
receiving a request to access the first media content item from the first client device; and
causing the first media content item to be displayed on the first client device.

15. The non-transitory computer-readable storage medium of claim 14, wherein the messaging server system to perform the method further comprising:
receiving a request to delete the first media content item from the first client device; and
causing the first media content item to be deleted from the storage,
wherein once the first media content item is deleted from the storage, the second client device cannot access the first media content item from the storage.

16. The non-transitory computer-readable storage medium of claim 13, wherein the messaging server system to perform the method further comprising:
receiving a request to access the first media content item from the second client device;
causing the first media content item to be displayed on the second client device;
receiving a request to post the first media content item from the second client device;
generating an altered first media content item, wherein generating the altered first media content item includes resizing the first media content item; and
causing the altered first media content item to be displayed on the display screen of the first client device or a third client device, wherein the third client device is associated with a third user.

17. The non-transitory computer-readable storage medium of claim 16, wherein generating the altered first media content item further includes:
receiving an edit to the first media content item from the second client device, wherein the edit to the first media content item is based on an input on the display screen displaying the first media content item from the second user.

18. The non-transitory computer-readable storage medium of claim 10, wherein the first electronic communication is generated by the first client device is at least one of:

a direct electronic communication to the second client device or an electronic communication to a plurality of client devices in communication with the server system over the network.

19. A system comprising:
a messaging server system including:
a database; and
an application server to
receive a first electronic communication from a first client device, wherein the first client device is associated with a first user,
generate a first media content item based on the first electronic communication,
cause the first media content item to be displayed on a display screen of a second client device, wherein the second client device is associated with a second user;
receive a request from the second client device to store the first media content item; and
in response to the request from the second client device, store the first media content item in a storage associated with the first user and the second user, the storage comprising a plurality of media content items stored by the first user and the second user, and
generate a notification to be displayed on a display screen of the first client device that indicates the first media content item is stored in the storage associated with the first user and the second user.

20. The system of claim 19, wherein the application server is further to:
receive a request to access the storage from the first client device or the second client device; and
cause a preview of a plurality of media content items stored in the storage to be displayed on the display screen of the first client device or the display screen of the second client device, wherein the plurality of media content items in the storage includes the first media content item.

* * * * *

UNITED STATES PATENT AND TRADEMARK OFFICE
CERTIFICATE OF CORRECTION

PATENT NO.         : 11,218,435 B1                                      Page 1 of 1
APPLICATION NO.    : 16/051020
DATED              : January 4, 2022
INVENTOR(S)        : Brody et al.

It is certified that error appears in the above-identified patent and that said Letters Patent is hereby corrected as shown below:

In the Claims

Column 21, Line 8, in Claim 19, after "to", insert --:--

Signed and Sealed this
First Day of March, 2022

Drew Hirshfeld
*Performing the Functions and Duties of the*
*Under Secretary of Commerce for Intellectual Property and*
*Director of the United States Patent and Trademark Office*